United States Patent [19]
Hayakawa et al.

[11] Patent Number: 6,165,256
[45] Date of Patent: Dec. 26, 2000

[54] PHOTOCATALYTICALLY HYDROPHILIFIABLE COATING COMPOSITION

[75] Inventors: Makoto Hayakawa; Mitsuyoshi Kanno, both of Kitakyushu, Japan

[73] Assignee: Toto Ltd., Fukuoka-ken, Japan

[21] Appl. No.: 09/232,494

[22] Filed: Jan. 15, 1999

Related U.S. Application Data

[63] Continuation of application No. PCT/JP97/02467, Jul. 16, 1997.

[30] Foreign Application Priority Data

| Jul. 19, 1996 | [JP] | Japan | 8-221641 |
| Aug. 31, 1996 | [JP] | Japan | 8-266554 |
| Sep. 20, 1996 | [JP] | Japan | 8-285796 |
| Dec. 24, 1996 | [JP] | Japan | 8-355953 |
| Jan. 8, 1997 | [JP] | Japan | 9-013048 |
| Feb. 24, 1997 | [JP] | Japan | 9-055533 |
| Mar. 26, 1997 | [JP] | Japan | 9-093232 |

[51] Int. Cl.⁷ ........................ C09K 3/18
[52] U.S. Cl. ............ 106/13; 106/286.1; 106/286.3; 106/286.4; 106/287.1; 106/287.13; 106/287.14; 106/287.16; 106/287.18; 106/287.19; 106/287.34
[58] Field of Search ............ 106/13, 286.1, 106/286.3, 286.4, 287.1, 287.13, 287.14, 287.16, 287.18, 287.19, 287.34

[56] References Cited

U.S. PATENT DOCUMENTS

| 3,347,816 | 10/1967 | Krauss et al. |
| 3,451,833 | 6/1969 | Bonitz et al. |
| 3,976,497 | 8/1976 | Clark |
| 4,954,465 | 9/1990 | Kawashima et al. |
| 4,955,208 | 9/1990 | Kawashima et al. |
| 5,547,823 | 8/1996 | Mursawa et al. |
| 5,595,813 | 1/1997 | Ogawa et al. |
| 5,616,532 | 4/1997 | Heller et al. |
| 5,643,436 | 7/1997 | Ogawa et al. |
| 5,755,867 | 5/1998 | Chikuni et al. ........... 106/287.16 |

FOREIGN PATENT DOCUMENTS

| 63100042 | 5/1988 | European Pat. Off. |
| 0433915A1 | 6/1991 | European Pat. Off. |
| 0590477A1 | 4/1994 | European Pat. Off. |
| 0633064A1 | 1/1995 | European Pat. Off. |
| 0636702A1 | 2/1995 | European Pat. Off. |
| 0816466A1 | 1/1998 | European Pat. Off. |
| 0857770A2 | 8/1998 | European Pat. Off. |
| 0869156A1 | 10/1998 | European Pat. Off. |
| 60-221702 | 11/1985 | Japan |
| 61-083106 | 4/1986 | Japan |
| 61-091042 | 5/1986 | Japan |
| 61-91042 | 5/1986 | Japan |
| 63-100042 | 5/1988 | Japan |
| 1-218635 | 8/1989 | Japan |
| 1-288321 | 11/1989 | Japan |
| 3-101926 | 4/1991 | Japan |
| 4-174679 | 6/1992 | Japan |
| 5-302173 | 11/1993 | Japan |
| 6-278241 | 10/1994 | Japan |
| 6-298520 | 10/1994 | Japan |
| 6-315614 | 11/1994 | Japan |
| 7-051646 | 2/1995 | Japan |
| 7-113272 | 5/1995 | Japan |
| 7-171408 | 7/1995 | Japan |
| 8-3544 | 1/1996 | Japan |
| 8-34973 | 2/1996 | Japan |
| 8-119673 | 5/1996 | Japan |
| 8-134381 | 5/1996 | Japan |
| 8-134437 | 5/1996 | Japan |
| 8-164334 | 6/1996 | Japan |
| 8141503 | 6/1996 | Japan |
| 8164334 | 6/1996 | Japan |
| 8-313705 | 11/1996 | Japan |
| 9024335 | 1/1997 | Japan |
| 9100437 | 4/1997 | Japan |
| WO95/11751 | 5/1995 | WIPO |
| WO9511751 | 5/1995 | WIPO |
| WO97/07069 | 2/1997 | WIPO |
| WO97/10185 | 3/1997 | WIPO |

OTHER PUBLICATIONS

Pt–Tio₂ thin films on glass substrates as efficient photocatalysts (Journal of Material Science 24 (Jan. 1989), No. 1, London.

*Primary Examiner*—David Brunsman
*Attorney, Agent, or Firm*—Jones, Day, Reavis & Pogue

[57] ABSTRACT

A composition is disclosed which can hydrophilify the surface of a member to impart an antifogging property to the surface of the member. The composition for hydrophilifying the surface of the member comprises at least (a) photocatalytic particles of a metallic oxide, (b) a precursor capable of forming a silicone resin film or a precursor capable of forming a silica film, and (c) a solvent, the total content of the photocatalytic particle and the solid matter of the precursor in the composition being 0.01 to 5% by weight. The hydrophilic property can be imparted simply by applying the composition onto a member and drying or heating the composition applied to the member. The resultant hydrophilic thin film is transparent and, hence, does not sacrifice the transparency and appearance of a member required to be transparent. Further, the surface of a member with the above composition applied thereto has such a property that water droplets adhered thereon can be immediately removed by vaporization and the surface is less likely to be soiled and, even when a contaminant is adhered thereon, can easily release the contaminant therefrom.

22 Claims, 6 Drawing Sheets

PHOTOCATALYTICALLY HYDROPHILIFIABLE COATING COMPOSITION

This application is a continuation of PCT Application No. PCT/JP97/02467 filed Jul. 16, 1997.

BACKGROUND OF THE INVENTION

1. Field of the Invention

The present invention relates to a composition which, when applied to the surface of a member, can highly hydrophilify the surface of the member and, in addition, can maintain the hydrophilicity. More particularly, the present invention relates to a composition which can highly hydrophilify the surface of mirrors, glass, lenses, and other members to prevent fogging of the surface of the articles or members and the formation of water droplets on the surface of the members or to clean the surface of the members or to accelerate removal of water droplets from the surface of the members by vaporization, thereby rapidly drying the surface of the articles or members.

2. Background Art

Windshields or windowpanes for automobiles and other vehicles, windowpanes for buildings, eyeglass lenses, and cover glasses for various instrument boards, when exposed to cold weather, are often fogged by moisture condensate. Further, bathroom or lavatory mirrors and eyeglass lenses are frequently fogged by steam. Exposure of the surface of an article to a temperature below the dew point of an atmosphere causes the moisture in the atmosphere to condense on the surface of the article and to grow into water droplets, creating a fog on the surface thereof. When condensed water droplets are very small with the diameter thereof being about half the wavelength of visible light, the water droplets scatter light, apparently rendering the glass and the mirror opaque, which also results in lost visibility.

Further progress of condensation of the moisture to thereby cause fine condensed water droplets to unite and grow into larger discrete water droplets brings about refraction of light in the interface of the water droplets and the surface of the article and in the interface of the water droplets and the air, causing clouding, blurring, creation of a spot pattern or otherwise fogging on the surface of the article. Consequently, in the case of a transparent article, such as glass, a see-through image is distorted, causing lowered see-through, while in the case of a mirror, a reflected image is disturbed.

Further, exposure of windshields or windowpanes for vehicles, windowpanes for buildings, rearview mirrors for vehicles, eyeglass lenses, and shields for masks or helmets to rainfall or a spray of water to thereby cause a large number of discrete water droplets to adhere onto the surface brings about clouding, blurring, creation of a spot pattern or otherwise fogging on the surface, which, here again, results in lost visibility.

It is needless to say that the "fogging or clouding" has a great effect on the safety and the efficiency of various works. For example, fogging or clouding of windshields or windowpanes of vehicles and rearview mirrors of vehicles in cold weather or rainy weather makes it difficult to ensure the field of vision and, hence, is detrimental to traffic safety for vehicles. Fogging of endoscopic lenses, dental mirrors, and converging lenses for laser dental treatment equipment will place an obstacle on proper diagnosis, operation, and treatment. Fogging of cover glasses for instrument boards renders reading of data difficult.

On the other hand, in the field of buildings and coatings, the pollution of the environment has posed a problem of contamination of exterior materials for buildings, outdoor buildings, and coatings provided thereon. Dust and particles floating in the air deposit on the roof and the outer wall of buildings in fine weather. Upon exposure to rainfall, the deposits flow together with rainwater and flow down along the outer wall of the building. Further, in rainy weather, suspended dust is carried by rain and flows down on the outer wall of the surface of the building and the surface of the outdoor building. As a result, the contaminant adheres along the course of the rainwater. As the surface dries, soil appears in a stripe pattern.

Combustion products, such as carbon black, municipal dust, and contaminants of inorganic materials, such as clay particles, constitute the soil on the coating of the exterior material for the building. Such a wide variety of contaminants are considered to render measures for antifouling complicate (Yoshinori Kitsutaka, "Gaiheki Shiage Zairyou No Osen No Sokushin Shiken Houhou (Accelerated Testing Method for Contamination of Finish Materials of Outer Wall)", Journal of Structural and Construction Engineering (Transactions of AIJ), No. 404, October 1989, pp. 15–24).

The use of a water-repellent paint, such as polytetrafluoroethylene (PTFE), has hitherto been considered preferable for preventing the exterior of the building and the like from being soiled. In recent years, however, that the surface of the coating is made hydrophilic as much as possible has become recognized as more effective for municipal dust containing a large amount of a hydrophobic component (Kobunshi, Vol. 44, May 1995. p. 307). Accordingly, coating of buildings with a hydrophilic graft polymer has been proposed in a newspaper ("Japan Chemical Week", January 30, 1995). According to this report, the coating has a hydrophilicity of 30 to 40° in terms of contact angle thereof with water.

Inorganic dust typified by clay minerals has a contact angle thereof with water of 20° to 50° and, hence, has affinity for the graft polymer having a contact angle thereof with water of 30° to 40° and is likely to adhere on the surface of the graft polymer. Therefore, it is considered that the coating of the graft polymer cannot satisfactorily prevent soiling with inorganic dust.

SUMMARY OF THE INVENTION

The present inventors have now found that a specific composition comprising photocatalytic particles of a metallic oxide, when applied to the surface of a member, can easily and highly hydrophilify the surface of the member and, at the same time, can maintain the high hydrophilicity. The present invention has been made based on such finding.

Accordingly, an object of the present invention is to provide a composition which can impart an antifogging property to the surface of a member.

Another object of the present invention is to provide a composition which can impart an antifogging property to the surface of a member without sacrificing the transparency of the member.

Still another object of the present invention is to provide a composition which, when applied to the surface of a member, can impart the property, to the surface of the member, of accelerating the evaporation of water droplets adhered onto the surface of the member to dry the member.

A further object of the present invention is to provide a composition which, when applied to the surface of a member, can impart such an property, to the surface of the member, that the surface of the member is less likely to be soiled and, even when once soiled, can easily release the contaminant therefrom.

According to one aspect of the present invention, there is provided a composition for hydrophilifying the surface of the member, comprising at least (a) photocatalytic particles of a metallic oxide, (b) at least one selected from a group consisting of silica fine particles, a precursor capable of forming a silicone resin film and a precursor capable of forming a silica film, and (c) a solvent, the total solid content of the photocatalytic particle and the silica fine particles or the precursor in the composition being 0.01 to 5% by weight.

DETAILED DESCRIPTION OF THE INVENTION

Definition

Figure 1:
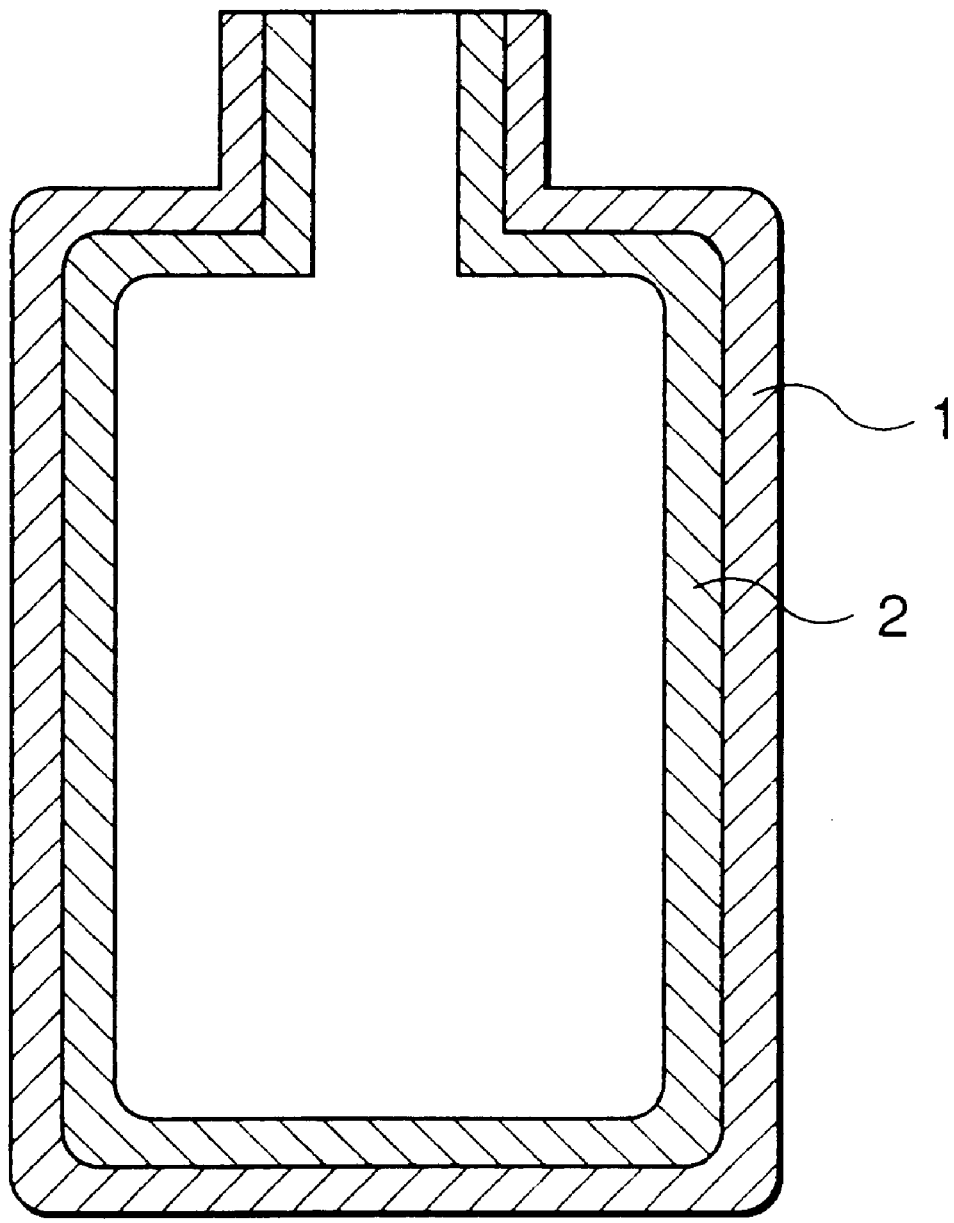
FIG. 1 is a diagram showing one embodiment of a preferred spray container to be filled with the composition of the present invention.

The term "antifogging" used herein broadly means prevention of optical troubles caused by fogging or clouding of a surface, by growth of condensed water droplets produced on the surface, or by adherence of water droplets onto the surface.

Hydrophilic surface

The composition of the present invention, when applied to the surface of a member, by a method described below, can hydrophilify the surface of the member. Preferably, the hydrophilified surface has wettability by water such that the contact angle of the surface with water is not more than 10°, preferably not more than 5°.

Further, the composition of the present invention has an advantage that the surface of the member can be highly hydrophilified while maintaining the transparency. That a hydrophilic property, specifically an antifogging property, can be imparted to members, required to be transparent, described below without sacrificing the transparency and the appearance is a great advantage of the present invention. Another great advantage is that imparting the hydrophilicity can be performed very simply by applying the composition of the present invention to the surface of a member and drying or heating the composition applied to the surface. It is, of course, expected that a variation in film thickness or uneven application is created depending upon methods for applying the composition onto the surface of members. According to the composition of the present invention, however, regulation of the amount of the composition applied so as to give a film thickness described below and selection of the method for applying the composition so as to give an even film permits the above excellent hydrophilic surface to be formed very simply.

In order to hydrophilify the member with the composition applied thereon, the surface is irradiated with light. The hydrophilification phenomenon is considered to proceed through the following mechanism. However, it should be noted that the following mechanism is merely hypothetical and should not be construed as limiting the scope of the present invention. Upon application of light having higher energy than the energy gap, of a photocatalyst, between the upper end of the valence band and the lower end of the conduction band to the photocatalyst results in photoexcitation of electrons in the valence band, creating conduction electrons and holes. Any one or both of them function to impart polarity (probably an electron-withdrawing property) to the surface of the photocatalyst. This permits water in an amount greater than the amount of water in equilibrium with the atmosphere to be chemisorbed onto the surface. This in turn increases surface free energy derived from a hydrogen bond, resulting in physical adsorption and fixation of water molecules in an amount corresponding to the increase in the surface free energy onto the surface. In general, when the surface free energy of one substance is close to that of another substance, these substances are likely to adhere to each other. Therefore, the surface with water molecules being physically adsorbed thereto has good wettability with water. This means that such a surface has been hydrophilified. Further, it has been found that the degree of hydrophilification of the surface provided by the composition of the present invention does not depend upon the thickness of the thin film provided by the composition of the present invention. It is already known that a photocatalyst has oxidative degradation activity and a thin film containing a photocatalyst has antisoiling, antibacterial, and deodorant effects based on such activity. The present inventors have confirmed that this oxidative degradation activity depends upon the thickness of the film containing the photocatalyst. Further, the present inventors have confirmed that the hydrophilification derived from the composition of the present invention can be developed even in a such a film thickness that the oxidative degradation activity is very low or is absent. Furthermore, the present inventors have confirmed that, in such a small thickness, of the film provided by the composition of the present invention, as will not influence the transparency of a transparent member, the oxidative degradation activity is very limited one or, in some cases, absent.

When the surface is once hydrophilified, the hydrophilicity, even when placed in a dark place, can be maintained for several weeks.

In order to highly hydrophilify the surface by photoexcitation of the photocatalyst, the irradiation intensity of the excitation light is preferably not less than 0.001 mW/cm$^2$, more preferably not less than 0.01 mW/cm$^2$, most preferably not less than 0.1 mW/cm$^2$ When the photocatalytic oxide is anatase form of titanium oxide, rutile form of titanium oxide, zinc oxide, or strontium titanate, sunlight, a room lamp, a fluorescent lamp, a mercury lamp, an incandescent lamp, a xenon lamp, a high pressure sodium lamp, a metal halide lamp, a BLB lamp and the like may be suitably utilized as the light source for photoexcitation of the photocatalyst. On the other hand, the photocatalytic oxide is tin oxide, a bactericidal lamp, a BLB lamp and the like are suitably used.

The thickness of the surface layer formed on the surface of the member by using the composition according to the present invention is preferably not more than 0.4 μm. When it is not more than 0.4 μm, haze development derived from irregular reflection can be prevented, so that the surface layer is substantially transparent. The thickness of the surface layer is more preferably not more than 0.2 μm from the viewpoint of effectively preventing the color development of the surface layer derived from the interference of light. The smaller the thickness of the surface layer, the better the transparency of the surface layer and, in addition, the better the abrasion resistance.

According to a preferred embodiment of the present invention, the content of the photocatalyst in the surface layer thus formed is preferably about $1\times10^{-7}$ to $1\times10^{-3}$ g/cm$^2$, more preferably about $5\times10^{-7}$ to $5\times10^{-4}$ g/cm$^2$ most preferably about $1\times10^{-6}$ to $1\times10^{-4}$ g/cm$^2$.

Even when moisture or steam in the air condenses on the highly hydrophilified surface provided by the composition of the present invention, the condensed water is likely to form a uniform water film without forming discrete water drops. Therefore, no light scattering fog is likely to be created on the surface of the member. Likewise, exposure of windowpanes, rearview mirrors for vehicles, windshields for vehicles, eyeglass lenses, and shields of helmets to rainfall or a spray of water does not result in the formation of discrete water droplets which obstruct the view, because water droplets adhered on the surface of these articles rapidly spread into an even water film. This permits a high level of view and visibility to be ensured, which in turn ensures traffic safety for vehicles and improves the efficiency of various works and activities.

Further, both types of contaminants, that is, hydrophobic contaminants including municipal dust, combustion products, such as carbon black contained in an exhaust gas of automobiles, fats and oils, and components eluted from sealants, and contaminants of inorganic clay materials, are less likely to adhere onto the highly hydrophilified surface provided by the composition of the present invention and, even when adhered thereon, can be easily washed away by rainfall or washing with water.

Furthermore, the highly hydrophilified surface provided by the composition of the present invention permits water droplets adhered thereon to be spread on the surface, accelerating the removal of the adhered water drops by evaporation.

Furthermore, the highly hydrophilified surface provided by the composition of the present invention has antistatic effect (effect of preventing deposition of dust), heat insulating effect, effect of preventing deposition of air bubbles under the water, effect of improving the efficiency in a heat exchanger, and effect of improving biocompatibility.

When the composition of the present invention is expected to have an antifogging effect, the member, to which the composition is to be applied, is generally transparent. The material for the member is not particularly limited, and examples thereof include glass and plastics. Specific examples of members to which the composition may be applied include mirrors, such as rearview mirrors for vehicles, bathroom mirrors, lavatory mirrors, dental mouth mirrors, reflecting mirrors for roads; lenses, such as eyeglass lenses, optical lenses, lighting lenses, lenses for semiconductors, lenses for copying machines, rearview camera lenses for vehicles; prisms; windowpanes for building or observation; windowpanes for vehicles, such as automobiles, railway vehicles, aircrafts, watercrafts, submarines, snowmobiles, ropeway gondolas, pleasure garden gondolas and spacecrafts; windshields for vehicles, such as automobiles, motorcycles, railway vehicles, aircrafts, watercrafts, submarines, snow cars, snowmobiles, ropeway gondolas, pleasure garden gondolas and spacecrafts; goggles for protection, goggles for sports, shields of masks for protection, shields of masks for sports, shields of helmets, glasses of display case for frozen foods, glasses of display cases for thermally kept foods, such as Chinese bun; covers for measuring instruments, covers of rearview camera lenses for vehicles, converging lenses for laser dental treatment equipments, covers of sensors for laser beam detection, such as sensors for vehicular gaps, covers of infrared sensors; filters of cameras, and films, sheets, seals and the like for application on the surface of the above articles.

On the other hand, when the composition of the present invention is expected to have a surface cleaning effect, the material for the member is not particularly limited, and examples thereof include metals, ceramics, glasses, plastics, woods, stones, cements, concretes, fibers, woven fabrics, and combinations of the above materials and laminates of the above materials. Specific examples of members to which the composition may be applied include building materials, exterior of buidlings, interior of buildings, sashes, windowpanes, structural members, exterior and coating of vehicles, exterior of machineries and articles, dustproof covers and coatings, traffic signs, various display devices, advertising towers or poster columns, noise barriers for roads, noise barriers for rail roads, bridges, exterior and coating of guard rails, interior facing and coating of tunnels, insulators, cover for solar cells, covers for solar energy collectors of solar water heaters, vinyl plastic hothouses, covers for lighting of vehicles, households, stools, bath tubs, wash basins, lighting equipment, covers for lighting, kitchenwares, tablewares, dishwashers, dishdryers, sinks, cooking ranges, kitchen hoods, ventilation fans, and films, sheets, seals and the like for application on the surface of the above articles.

Further, when the composition of the present invention is expected to have the effect of accelerating the removal of water droplets by evaporation, the material for the member is not particularly limited, and examples thereof include metals, ceramics, glasses, plastics, woods, stones, cements, concretes, fibers, woven fabrics, and combinations of the above materials and laminates of the above materials. Specific examples of members to which the composition may be applied include bodies of automobiles, windows, paved roads, and films, sheets, seals and the like for application on the surface of the above articles.

Further, when the composition of the present invention is expected to have an antistatic effect, the material for the member is not particularly limited, and examples thereof include metals, ceramics, glasses, plastics, woods, stones, cements, concretes, fibers, woven fabrics, and combinations of the above materials and laminates of the above materials. Specific examples of members to which the composition may be applied include cathode-ray tubes; magnetic recording media; optical recording media; photomagnetic recording media; audio tapes; video tapes; analog records; housings, components, exterior and coatings of domestic electric appliances; housings, components, exterior and coatings of office automation equipment; building materials; exterior of the buidlings; interior of the buildings; sashes;

windowpanes; structural members; exterior and coating of vehicles; exterior of machineries and articles; dustproof covers and coatings; and films, sheets, seals and the like for application on the surface of the above articles.

Surface hydrophilifying composition

The composition according to the present invention basically comprises (a) photocatalytic particles of a metallic oxide, (b) at least one selected from a group consisting of silica fine particles, a precursor capable of forming a silicone resin film and a precursor capable of forming a silica film, and (c) a solvent. Further, the composition of the present invention may, if necessary, contain additional components.

Photocatalytic particles

The photocatalytic particles contained in the composition according to the present invention basically comprise a metallic oxide. Specifically, in the present invention, the term "photocatalyst" used herein refers to a material which, when exposed to light (excitation light) having higher energy (i.e., shorter wavelength) than the energy gap between the conduction band and the valence band of the crystal, can cause excitation (photoexcitation) of electrons in the valence band to produce a conduction electron and a hole. Photocatalytic oxides usable herein include, for example, anatase form of titanium oxide, rutile form of titanium oxide, zinc oxide, tin oxide, ferric oxide, dibismuth trioxide, tungsten trioxide, and strontium titanate.

The average crystallite diameter of the photocatalytic particles is preferably not more than 100 nm. The upper limit of the average crystallite diameter is preferably about 20 nm, more preferably about 10 nm. The lower limit of the average crystallite diameter is preferably about 1 nm, more preferably about 3 nm. An average crystallite diameter of the photocatalytic particles in the above range makes it possible to hydrohilify the surface and prevent loss of transparency, of a surface with the composition applied thereto, derived from scattering of visible light caused by the particles.

The average crystallite diameter of the photocatalytic particles may be determined according to the Scherrer's equation based on the integration width of a peak having the highest intensity around 2θ=25.3 by powdery X-ray diffractometry of the particles.

Silica fine particles and Precursor of silicone resin film and silica film

The composition of the present invention contains silica fine particles. The silica may effectively immobilize the photocatalytic particles on the surface of a member. According to a preferred embodiment of the present invention, the average particle diameter of the silica fine particles is in the range of 1 to 100 nm, preferably 5 to 50 nm, most preferably 8 to 20 nm. The diameter may be determined by, for example, the dynamic laser scattering method.

One preferred example of the precursor capable of forming a silica film which may be used in the composition of the present invention is a silicate represented by the following average composition formula:

$$SiX_qO_{(4-q)/2}$$

wherein X represents an alkoxy group or a halogen atom and q is a number satisfying 0<q<4.

Another preferred example of the precursor, of a silica coating, capable of forming a silica coating which may be used in the composition of the present invention is a tetrafunctional, hydrolyzable silane derivative represented by the general formula:

$$SiX_4$$

wherein X represents an alkoxy group or a halogen atom.

Specific examples of preferred tetrafunctional, hydrolyzable silane derivatives include tetramethoxysilane, tetraethoxysilane, tetrapropoxysilane, tetrabutoxysilane, diethoxydimethoxysilane, tetrachlorosilane, tetrobromosilane, silanol, and dimethoxydiethoxysilane.

Specific examples of preferred silicates include partial hydrolyzates and dehydropolycondensation products of the tetrafunctional, hydrolyzable silane derivatives.

One preferred example of the precursor, of a silicone coating, capable of forming a silicone film which may be used in the composition of the present invention is a siloxane represented by the average composition formula:

$$R_pSiX_qO_{(4-p-q)/2}$$

wherein R represents a member selected from the group consisting of a hydrogen atom and one or more organic groups;

X represents an alkoxy group or a halogen atom; and p is a number satisfying 0<p<2 and q is a number satisfying 0<q<4.

One preferred example of the precursor capable of forming a silicone film which may be used in the composition of the present invention is a hydrolyzable silane derivative represented by the general formula:

$$R_pSiX_{4-p}$$

wherein R is as defined above;

X represents an alkoxy group or a halogen atom; and p is 1 or 2.

In this case, the organic group represented by R refers to preferably an alkyl (more preferably an unsubstituted alkyl having 1 to 18 carbon atoms, most preferably an alkyl having 3 to 18 carbon atoms) or an aryl (preferably phenyl).

Specific examples of preferred hydrolyzable silane derivatives include methyltrimethoxysilane, methyltriethoxysilane, methyltripropoxysilane, methytributoxysilane, ethyltrimethoxysilane, ethyltriethoxysilane, ethyltripropoxysilane, ethyltributoxysilane, phenyltrimethoxysilen, phenyltriethoxysilane, phenyltripropoxysilane, phenyltributoxysilane, dimethyldimethoxysilane, dimethyldiethoxysilane, dimethyldipropoxysilane, dimethydibutoxysilane, diethyldimethoxysilane, diethyldiethoxysilane, diethyldipropoxysilane, diethyldibutoxysilane, phenylmethyldimethoxysilane, phenylmethyldiethoxysilane, phenylmethyldipropoxysilane, phenylmethyldibutoxysilane, n-propyltrimethoxysilane, n-propyltriethoxysilane, n-propyltripropoxysilane, n-propyltributoxysilane, γ-glycosidoxypropyltrimethoxysilane, and γ-acryloxypropyltrimethoxysilane.

The siloxane may be prepared by partial hydrolysis and dehydropolycondensation of the hydrolyzable silane derivative, or by dehydropolycondensation of a partial hydrolyzate of the hydrolyzable silane derivative with a partial hydrolyzate of tetramethoxysilane, tetraethoxysilane, tetrapropoxysilane, tetrabutoxysilane, diethoxydimethoxysilane or the like.

The silicone resin prepared by partial hydrolysis or dehydropolycondensation of the above precursor according to the following method is represented by the following average composition formula:

$$R_pSiO_{(4-p)/2} \quad (I)$$

wherein R is as defined above;

X is an alkoxy group or a halogen atom; and p is a number satisfying 0<p<2.

The content of the precursor in the composition according to the present invention may be suitably determined. For example, in terms of the silica content based on one part by weight of the photocatalytic particle, the upper limit of the precursor content is preferably 10 parts by weight, more preferably 5 parts by weight, most preferably 1 part by weight, and the lower limit of the precursor content is preferably 0.05 part by weight, more preferably 0.1 parts by weight, and most preferably 0.2 parts by weight.

Solvent

The solvent contained in the composition of the present invention is not limited so far as it can stably disperse the photocatalytic particles and the precursor and a hydrophilified surface is finally provided. Examples of solvents usable herein include water, an organic solvent, and a mixed solvent composed of water and an organic solvent. Water, an alcohol, or a mixed solvent composed of water and an alcohol is particularly preferred.

The total of the weight of the photocatalytic particle and the weight of the silica fine particle or the weight, in terms of silica, of the precursor (this total content being often referred to as "solid content") is brought to more than 0.01 to not more than 5% by weight in the composition of the present invention. The solid content can be simply determined as follows. The composition (weight: A) is heated at 400 to 500° C. for 3 hr to remove the liquid component, and the weight of the residue (weight: B) is then measured, followed by calculation of the solid content (%) according to the following equation:

Solid content (%)=(B/A)×100

When the solid content exceeds 5% by weight, the surface with the composition applied thereto disadvantageously has an appearance suffering from haze development or has interference fringes. The upper limit of the solid content is more preferably not more than 1% by weight. When the solid content is less than 0.01% by weight, there is a possibility that a surface having satisfactory hydrophilicity cannot be efficiently formed. The lower limit of the solid content is preferably 0.05% by weight, most preferably 0.1% by weight. In the composition of the present invention, the amount of the solvent is determined so that the solid content of the photocatalytic particle and the precursor falls within the above range.

According to a preferred embodiment of the present invention, use of an alcohol, which has a molecular weight of 60 to 300, preferably a molecular weight of 60 to 100 and is liquid at room temperature, is preferred.

Examples of preferred alcohols usable herein include methanol, ethanol, n-propanol, isopropanol, t-butanol, isobutanol, n-butanol, 2-methylpropanol, pentanol, ethylene glycol, monoacetone alcohol, diacetone alcohol, ethylene glycol monomethyl ether, 4-hydroxy-4-methyl-2-pentanone, dipropylene glycol, propylene glycol, tripropylene glycol, 1-ethoxy-2-propanol, 1-butoxy-2-propanol, 1-propoxy-2-propanol, propylene glycol monomethyl ether, dipropylene glycol monomethyl ether, dipropylene glycol monoethyl ether, tripropylene glycol monomethyl ether, and 2-butoxyethanol.

Addition of water as the solvent is often preferred from the viewpoint of accelerating the hydrolysis of the precursor of silica. For example, when tetraethoxysilane, tetramethoxysilane, tetrabutoxysilane, tetrapropoxysilane, tetrachlorosilane, or tetrabromosilane is used as the precursor of silica, the presence of water accelerates the hydrolysis upon application, of the composition according to the present invention, in such a manner as described below.

Other components

The composition according to the present invention may contain optional components besides the above components.

According to a preferred embodiment of the present invention, the composition according to the present invention contains a material having a refractive index of not more than 2. Addition of the material having a refractive index of not more than 2 can offer an advantage that the reflection of visible light on the surface with the composition applied thereto can be effectively prevented.

Examples of materials having a refractive index of not more than 2 which may be added to the composition according to the present invention include silica (refractive index 1.5), tin oxide (refractive index 1.9), calcium carbonate (refractive index 1.6), calcium hydroxide (refractive index 1.6), magnesium carbonate (refractive index 1.5), strontium carbonate (refractive index 1.5), dolomite (refractive index 1.7), calcium fluoride (refractive index 1.4), magnesium fluoride (refractive index 1.4), alumina (refractive index 1.6), quartz sand (refractive index 1.6), zeolite (refractive index 1.5), montmorillonite (refractive index 1.5), kaolin (refractive index 1.6), sericite (refractive index 1.6), ferric oxide (refractive index 1.8), and yttrium oxide (refractive index 1.9).

According to another preferred embodiment of the present invention, the composition of the present invention may further comprise a surfactant. Addition of the surfactant enables high hydrophilicity and antifogging property to be imparted to the surface of a member even immediately after the application of the composition onto the member. In particular, when the composition according to the present invention contains an alcohol, the addition of the surfactant is preferred. In some cases, several hours are necessary for achieving the photo-hydrophilification of the surface with the composition of the present invention applied thereto. In this case, when the alcohol derived from the composition of the present invention remains on the surface, the hydrophilification of the surface is often unsatisfactory until the hydrophilification by the photocatalyst is achieved. Addition of the surfactant can advantageously hydrophilify the surface to a satisfactory extent, thereby imparting an antifogging property, even immediately after the application of the composition. Further, the addition of the surfactant can offer an additional advantage that the composition of the present invention can be evenly applied onto the surface of a member.

According to a preferred embodiment of the present invention, the amount of the surfactant added is less than 10 parts by weight, more preferably about 0.1 to 2 parts by weight, based on one part by weight of the photocatalytic particle.

Examples of surfactants which may be added to the composition of the present invention include anionic surfactants, such as ammonium polyoxyethylene alkylphenyl ether sulfonate, sodium polyoxyethylene alkylphenyl ether sulfonate, fatty acid sodium soap, fatty acid potassium soap, sodium dioctylsulfosuccinate, alkyl sulfate, alkyl ether sulfate, sodium alkylsulfate, sodium alkyl ether sulfate, polyoxyethylene alkyl ether sulfate, sodium polyoxyethylene alkyl ether sulfate, TEA salt of alkylsulfate, TEA salt of polyoxyethylene alkyl ether sulfate, sodium salt of 2-ethylhexylalkylsulfuric ester, sodium acyl methyl taurate, sodium lauroyl methyl taurate, sodium dodecylbenzensulfonate, disodium lauryl sulfosuccinate, disodium lauryl polyoxyethylene sulfosuccinate, polycarboxylic acid, oleoylsarcosin, amide ether sulfate, lauroyl sarcosinate, and sodium salt of sulfo-FA ester; nonionic surfactants, such as polyoxyethylene lauryl ether, polyoxyethylene tridecyl ether, polyoxyethylene cetyl ether, polyoxyethylene stearyl ether, polyoxyethylene oleyl ether, polyoxyethylene alkyl ether, polyoxyethylene alkyl ester, polyoxyethylene alkylphenol ether, polyoxyethylene nonylphenyl ether, polyoxyethylene octylphenyl ether, polyoxyethylene laurate, polyoxyethylene stearate, polyoxyethylene alkylphenyl ether, polyoxyethylene oleate, sorbitan alkyl ester, polyoxyethylene sorbitan alkyl ester, polyether-modified silicone, polyester-modified silicone, sorbitan laurate, sorbitan stearate, sorbitan palmitate, sorbitan oleate, sorbitan sesquioleate, polyoxyethylene sorbitan laurate, polyoxyethylene sorbitan stearate, polyoxyethylene sorbitan palmitate, polyoxyethylene sorbitan oleate, glycerol stearate, polyglycerin fatty ester, alkylalkylol amide, lauric acid diethanol amide, oleic acid diethanol amide, oxyethylene dodecylamine, polyoxyethylene dodecylamine, polyoxyethylene alkylamine, polyoxyethylene octadecylamine, polyoxyethylene alkylpropylene diamine, polyoxyethylene oxypropylene block polymer, and polyoxydiethylene stearate; amphoteric surfactants, such as dimethyl alkyl betaine, alkylglycin, amide betaine, and imidazoline; and cationic surfactants, such as octadecyl dimethyl benzyl ammonium chloride, alkyl dimethyl benzyl ammonium chloride, tetradecyl dimethyl benzyl ammonium chloride, dioleyl dimethyl ammonium chloride, quaternary salt of 1-hydroxyethyl-2-alkylimidazoline, alkylisoquinolinium bromide, polymeric amine, octadecyl trimethyl ammonium chloride, alkyl trimethyl ammonium chloride, dodecyl trimethyl ammonium chloride, hexadecyl trimethyl ammonium chloride, behenyl trimethyl ammonium chloride, quaternary salt of alkylimidazoline, dialkyl dimethyl ammonium chloride, octadecylamine acetate, tetradecylamine acetate, alkylpropylenediamine acetate, and didecyl dimethyl ammonium chloride.

According to a preferred embodiment of the present invention, the composition of the present invention contains an acid. Addition of the acid can increase the polarity of the surface with the composition of the present invention applied thereto, permitting good hydrophilicity to be maintained even in a dark place.

Examples of acids which may be added to the composition of the present invention include acids having a high capability of imparting polarity to the surface, such as nitric acid, sulfuric acid, hydrochloric acid, acetic acid, propionic acid, maleic acid, adipic acid, fumaric acid, phthalic acid, valeric acid, lactic acid, butyric acid, citric acid, malic acid, picric acid, formic acid, carbonic acid, and phenol. Among them, nitric acid, hydrochloric acid, and sulfuric acid are particularly preferred.

According to another preferred embodiment of the present invention, the composition of the present invention contains a catalyst for hydrolysis of a silane. The presence of this catalyst accelerates the hydrolysis of the silane compound as the precursor upon the application, of the composition of the present invention, in such a manner as described below. Examples of preferred catalysts include nitric acid, sulfuric acid, hydrochloric acid, acetic acid, propionic acid, maleic acid, adipic acid, fumaric acid, phthalic acid, valeric acid, lactic acid, butyric acid, citric acid, malic acid, picric acid, formic acid, carbonic acid, and phenol, the above acids having a pH of 2 to 5.

According to a preferred embodiment of the present invention, the composition of the present invention, when the precursor of silica is a silanol, contains a silanol polymerization curing catalyst. The presence of this catalyst can accelerate the polymerization reaction of the silanol upon the application, of the composition of the present invention, in such a manner as described below. Examples of preferred catalysts usable herein include aluminum compounds, such as aluminum chelate, aluminum acetyl acetonate, aluminum perchlorate, aluminum chloride, aluminum isobutoxide, and aluminum isopropoxide; titanium compounds, such as tetraisopropyl titanate, and tetrabutyl titanate; basic compounds, such as lithium hydroxide, sodium hydroxide, potassium hydroxide, sodium methylate, sodium acetate, sodium formate, potassium acetate, potassium formate, potassium propionate, tetramethyl ammonium chloride, and tetramethyl ammonium hydroxide; amine compounds, such as n-hexylamine, tributylamine, diazabicycloundecene, ethylenediamine, hexanediamine, diethylenetriamine, tetraethylenepentamine, triethylenetetramine, ethanolamines, γ-aminopropyl trimethoxysilane , γ-aminopropylmethyldimethoxysilane, γ-(2-aminoethyl)-aminopropyltrimethoxysilane, and γ-(2-aminoethyl)-aminopropylmethyldimethoxysilane; tin compounds, such as tin acetyl acetonate, and dibutyltin octylate; metal-containing compounds, such as cobalt octylate, cobalt acetyl acetonate, and iron acetyl acetonate; and acidic compounds, such as phosphoric acid, nitric acid, phthalic acid, p-toluenesulfonic acid, and tirchloroacetic acid.

According to a preferred embodiment of the present invention, the composition of the present invention contains a levelling agent so that it, when applied to the surface of a member, can form a smooth surface. The addition of the levelling agent is advantageous particularly when the composition of the present invention is applied to a large article. Examples of preferred levelling agents include diacetone alcohol, ethylene glycol monomethyl ether, 4-hydroxy-4-methyl-2-pentanone, dipropylene glycol, tripropylene glycol, 1-ethoxy-2-propanol, 1-butoxy-2-propanol, propylene glycol monomethyl ether, 1-propoxy-2-propanol, dipropylene glycol monomethyl ether, dipropylene glycol monoethyl ether, and tripropylene glycol monomethyl ether.

According to a preferred embodiment, the composition of the present invention further comprises an antibacterial metal (for example, silver, copper, or zinc) or a compound of the metal. The addition of the above metal enables bacteria present on the surface of a member to be killed at the time of the application of the composition of the present invention onto the surface of the member. Further, after the application of the composition onto the member, growth of organisms, such as fungi, algae, and moss, on the surface can be inhibited.

Further, according to another preferred embodiment of the present invention, the composition of the present invention further comprise at least one platinum group metal selected from the group consisting of platinum, palladium, rhodium, ruthenium, osmium, and iridium. It is known that a surface having a photocatalyst of a metallic oxide has antisoiling, antibacterial and deodorizing functions based on the oxidative degradation activity of the photocatalyst. The surface of a member with the composition of the present invention applied thereto appears to maintain this activity. The above metal appears to enhance the oxidative degradation activity of the photocatalyst to improve the antibacterial property, deodorizing property, gas decomposing property, organic matter decomposing property and other properties of the surface.

The composition of the present invention, when stored in a tin container or a container constructed of a lined metal or when applied onto a metallic member, is preferably weakly acidic, neutral or basic. In particular, when an acid is added as in the above embodiment, the addition of a pH adjustor is preferred.

Further, the composition of the present invention may optionally contain an acid or a base in order to improve the dispersibility of the solid component(s) contained therein and to improve the storage stability of the composition. Further, if necessary, it may further comprise pigments, dyes, storage stabilizers and the like.

Application of composition of present invention onto surface of member

The composition of the present invention is applied onto the surface, of a member, to which hydrophilic nature or antifogging property is to be imparted, and the composition applied to the surface is then dried or cured to form a thin film.

As described above, preferably, the composition of the present invention is finally brought to a thin film having a thickness of not more than 0.4 $\mu$m, preferably not more than 0.2 $\mu$m, on a member. In order to form such a thin film, the composition of the present invention is applied onto the surface of the member at a coverage of preferably about $1\times10^{-4}$ to 20 mg/cm$^2$, more preferably about $5\times10^{-4}$ to 1 mg/cm$^2$.

The composition of the present invention may be applied onto the surface of the member by any suitable method, and examples of suitable methods include spray coating, dip coating, flow coating, spin coating, roll coating, brush coating, and sponge coating.

The composition after the application onto the surface of the member is then dried or cured to form a thin film. The term "dried or cured" used herein means that the precursor of silica or the precursor of silicone contained in the composition according to the present invention is converted to silica or silicone. Therefore, drying may be performed by either air drying or heat drying. Alternatively, ultraviolet irradiation or the like may be conducted to cause polymerization so far as the precursor is converted to silica or silicone.

According to a preferred embodiment of the present invention, the composition of the present invention is supplied in such a state that it is filled into a spray container, permitting users to suitably apply the composition of the present invention to the surface of a desired member.

A spray container suitable for filling the composition of the present invention therein is shown in FIG. 1. A container frame 1 is preferably made of aluminum which is lightweight, easy to work, and firm. However, duralumin, copper-aluminum alloy, titanium alloy, stainless steel and the like may also be utilized.

Figure 2:
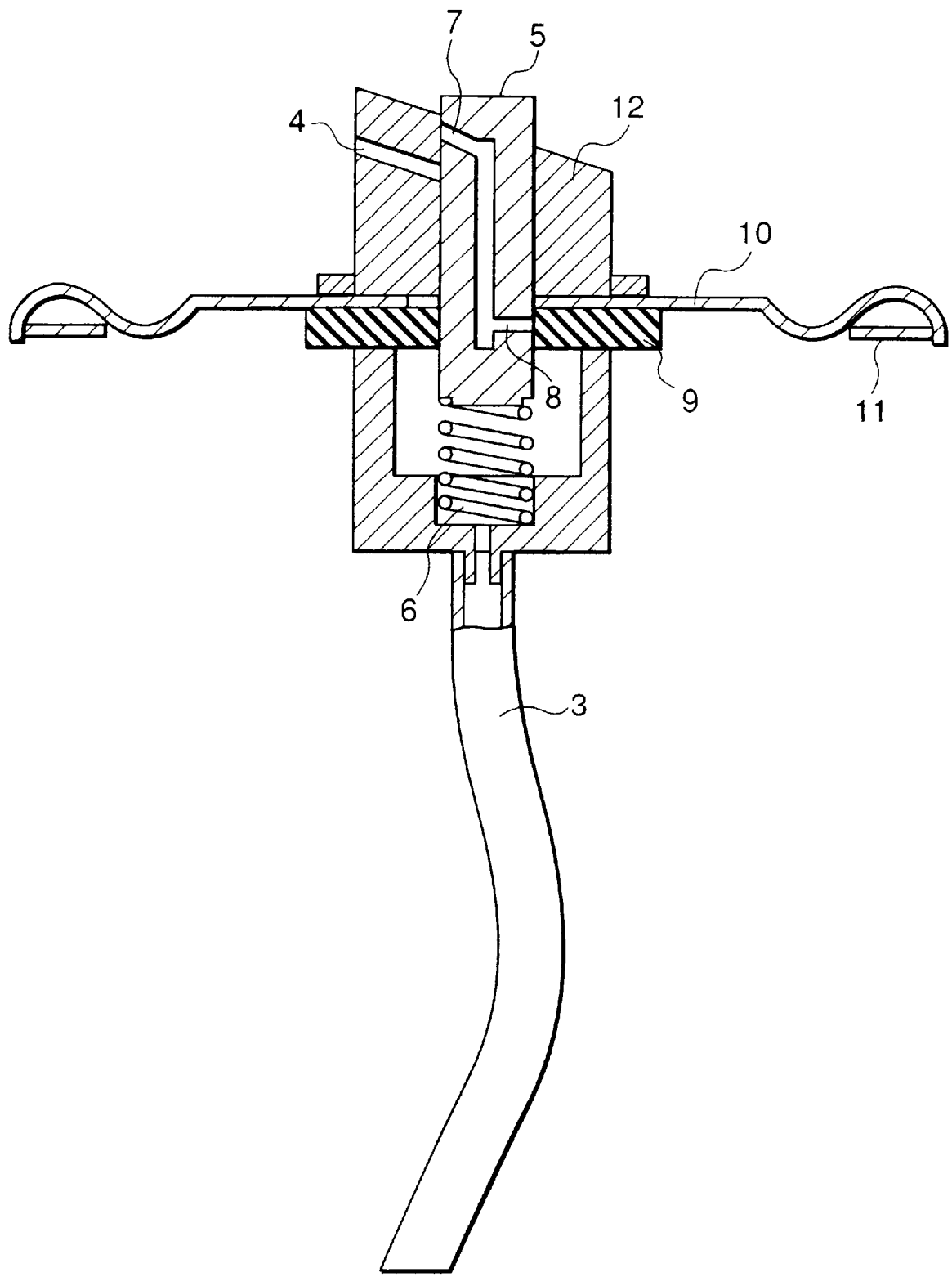
FIG. 2 is a diagram showing one embodiment of a preferred cap for the spray container shown in FIG. 1.

When the composition of the present invention is acidic, an acid-resistant resin lining 2 is preferably provided from the viewpoint of avoiding direct contact of the metallic container frame 1 with the acidic composition. Acid-resistant linings usable herein include linings of ABS resin, polycarbonate, methylpentene resin, polyvinyl chloride, polypropylene, polyethylene, ethylene tetrafluoride resin, ethylene propylene fluoride, ethylene chloride trifluoride resin, vinylidene fluoride resin, alkoxy perfluoride resin, phenolic resin, epoxy resin, acrylic resin, polyether chloride, polysulfone, polystyrene, polyphenylene oxide, polyphenylene sulfide, polyimide, nylon, and ionomer. In the container shown in FIG. 1, a removable cap shown in FIG. 2 may be mounted on the top of the container. This cap comprises: a tube 3 for leading the composition of the present invention to an ejection section; an ejection nozzle 4; a stem 5 with the uppermost portion being located above a housing 12 so as to be pressed by a finger, a coil spring 6; a rubber 9; a mountain cap 10; a packing 11 provided at a portion where the mountain cap 10 engages the upper part of the container frame 1; and a housing 12. The stem 5 has in its interior a hole for leading the composition of the present invention to the ejection section. A communicating port 7 is provided above the ejection nozzle 4, and a communicating port 8 is provided toward a certain position of the rubber 9.

Therefore, before pressing of the stem 5, the communicating port 7 does not engage the ejection nozzle 4, and the communicating port 8 is sealed by the rubber, thus preventing the composition from being delivered. Upon pressing of the stem 5, the communicating port 8 is positioned in a space sandwiched between the stem 5 and the housing 12, and the composition which has been led from the tube 3 to the space between the stem 5 and the housing 12 is led to the hole in the interior of the stem 5. At the same time, the communicating port 7 engages the ejection nozzle 4, permitting the composition led to the hole in the interior of the stem 5 to be ejected though the ejection nozzle 4.

Preferably, the above acid-resistant resin is used in the interior of the tube 3, the stem 5, the ejection nozzle 4, and the housing 12.

Preferably, the rubber 9 is also an acid-resistant rubber, i.e., an ethylene rubber, a propylene rubber, or a silicone rubber or the like.

Preferably, the ejection nozzle 4 is slightly inclined upward.

Further, In the interior of the stem 5, the hole in its portion connected to the ejection nozzle may be provided with a cruciform groove or a spiral groove so that the composition can be easily led to the nozzle.

Figure 3:
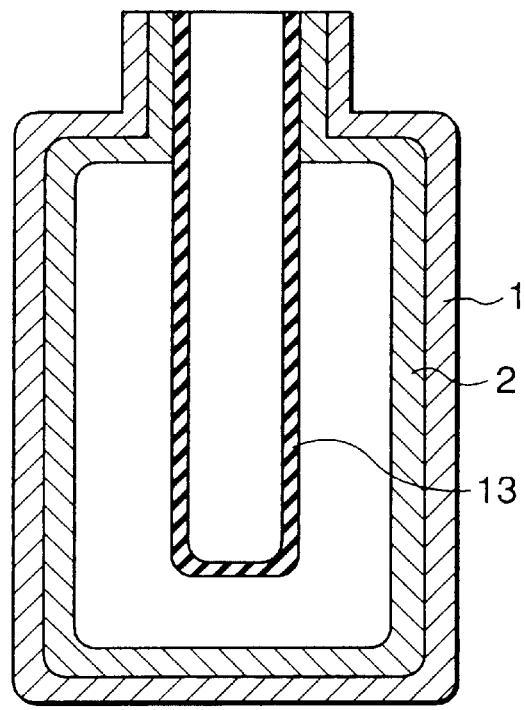
FIG. 3 is a diagram showing one embodiment of another preferred spray container to be filled with the composition of the present invention.
Figure 4:
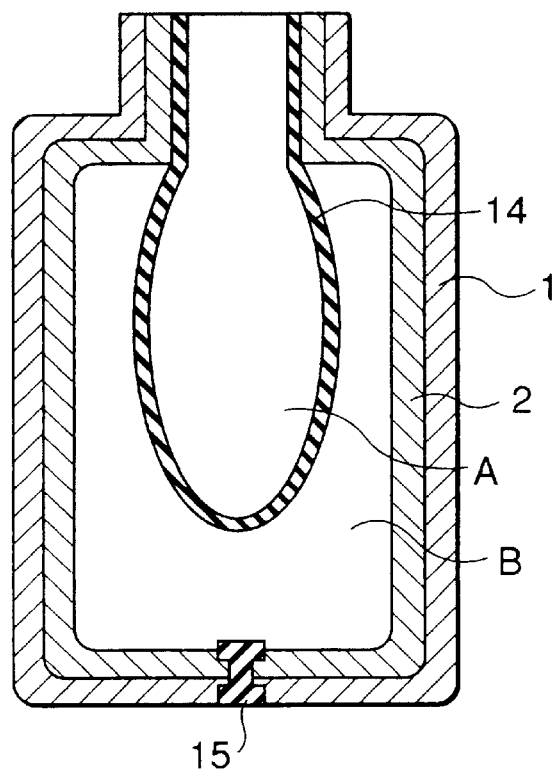
FIG. 4 is a diagram showing one embodiment of still another preferred spray container to be filled with the composition of the present invention.

According to other embodiments of the spray container, double-container structures shown in FIGS. 3 and 4 may be suitable.

In the construction shown in FIG. 3, an inner container 13 is provided inside the container shown in FIG. 1, and the inner container 13 is filled with a coating liquid sample D11 and a propellant gas, such as a nitrogen gas, DEM, or LPG. This construction is preferred because even when the resin lining has pinholes, the composition of the present invention does not come into direct contact with the metallic container frame 1.

In the construction shown in FIG. 4, a balloon container 14 having pressure resistance and good transmission of pressure is provided, as an inner container, inside the container shown in FIG. 1, and a hole is provided at the bottom of the container. This construction permits a gas and a liquid to be filled into separate respective sections of the container. For example, the balloon container 14 (section A in the drawing) may be filled with the composition of the present invention with a space (section B in the drawing) between the outer container and the balloon container being filled with a nitrogen gas. Therefore, unfavorable phenomena, for example, a lowering in pressure within the container due to gradual dissolution of the gas in the liquid, can be prevented.

The nitrogen gas is filled through the hole at the bottom of the container, and the hole of the container is then sealed with a rubber stopper 15. This enables the residual pressure after use to be released simply by removing the stopper 15, advantageously offering safety.

Figure 5A:
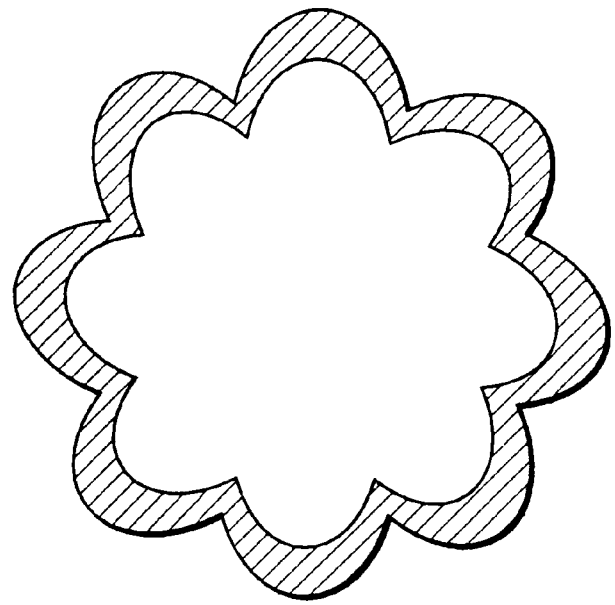
FIGS. 5(a) and (b) are diagrams showing embodiments of the sectional form of a balloon constituting a spray container to be filled with the composition of the present invention.
Figure 5B:
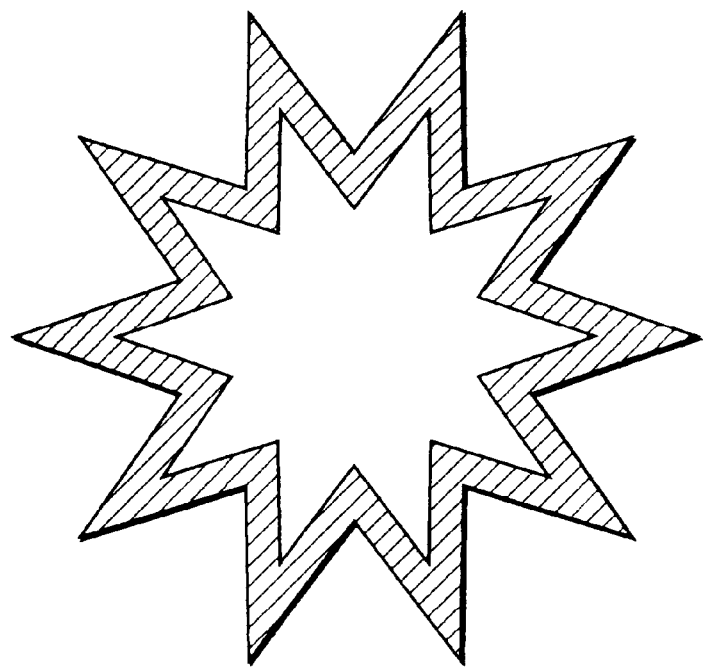

Polyethylene, polyvinyl chloride and the like having pressure resistance and good transmission of pressure are suitable for constructing the balloon container 14. Use of a sectional form full of irregularities, such as a petal-like sectional form, as shown in FIGS. 5(a) and 5(b) is preferred from the viewpoint of improving the transmission of pressure.

Besides the nitrogen gas, ether gases, such as dimethylene ether, and inert gases, such as argon and helium, may be used as the filler gas.

EXAMPLES

The present invention will be described in more detail with reference to the following examples, though it is not limited to these examples only.

The composition and means of acquision of titanium oxide sols used in the following examples are as follows.

Titanium oxide sol ST-K01: A composition composed of 8 parts by weight of titanium oxide (anatase form) particles, 2 parts by weight of an alkyl silicate, 54.8 parts by weight of an aqueous nitric acid solution, 28 parts by weight of methanol, and 7.2 parts by weight of propanol; available from Ishihara Sangyo Kaisha Ltd.

Titanium oxide sol ST-K03: A composition composed of 5 parts by weight of titanium oxide (anatase form) particles, 5 parts by weight of an alkyl silicate, 54.8 parts by weight of an aqueous nitric acid solution, 28 parts by weight of methanol, and 7.2 parts by weight of propanol; available from Ishihara Sangyo Kaisha Ltd.

Titanium oxide sol TA-15: A composition composed of 15 parts by weight of titanium oxide (anatase form) particles and 85 parts by weight of an aqueous nitric acid solution; available from Nissan Chemical Industries Ltd.

Example A1

Precursor of silica film and amount of solvent

A titanium oxide sol (ST-K01) was diluted 10 times, 100 times, or 1000 times with ethanol prepare samples A1, A2 and A3. The solid contents of samples A1, A2 and A3 are 1 wt %, 0.1 wt % and 0.01 wt %, respectively.

These samples were allowed to stand for 3 days. As a result, no agglomeration was created.

The samples A1 to A3 were coated on a 10-cm square soda-lime glass substrate, and the coatings were dried at room temperature for 18 hr.

As a result, for all the samples, a transparent and uniform coating was formed. For the coating of the sample A1, interference fringes were also observed.

Subsequently, each coating was irradiated with light from a light source (BLB (black light blue) fluorescent lamp, manufactured by Sankyo Denki) at an ultraviolet irradiation intensity of 0.25 mW/cm$^2$ for one hr. Thereafter, the antifogging property of these coatings was evaluated. The evaluation criteria were as follows.

⊚: Breathing on the coated glass resulted in no fogging.

○: Breathing on the coated glass resulted in slight fogging with an image being still clearly seen through the coated glass.

Δ: Breathing on the coated glass resulted in fogging to such an extent that an image could not be clearly seen through the coated glass although the fogging is not severe as compared with that created in the substrate glass per se.

×: Breathing on the coated glass resulted in fogging comparable with that created in the substrate glass per se.

For the antifogging property, the samples A1 and A2 were evaluated as ⊚, and the sample A3 as ×.

For the sample A1, the adhesion of the coating to the substrate and the peelability of the coating from the substrate were evaluated. In this case, for the evaluation of the adhesion of the coating to the substrate, Kimwipe impregnated with water was slid on the coating to determine the number of sliding operations necessary for causing the coating to be peeled from the substrate. The adhesion of the coating to the substrate was evaluated in terms of this number of sliding operations. On the other hand, for the evaluation of the peelability of the coating from the substrate, a plastic eraser was slid on the coating to determine the number of sliding operations necessary for causing the coating to be completely peeled off from the substrate. The peelability of the coating from the substrate was evaluated in terms of this number of sliding operations. Each test was repeated three times.

As a result, for the adhesion of the coating to the substrate, no peeling occurred after the sliding operation was repeated 20 times. On the other hand, for the peelability of the coating from the substrate, 2 to 3 sliding operations resulted in complete peeling of the coating from the substrate.

Example A2

Addition of copper

An aqueous copper sulfate solution (100 μl) having a copper concentration of 1 g/liter was added to 10 g of a titanium oxide sol (ST-K01), and the mixture was diluted 100 times with ethanol. The diluted liquid was allowed to stand for 3 days. As a result, it did not cause any agglomeration, that is, had good dispersion, suggesting that addition of copper as an antibacterial metal to the coating liquid does not affect the performance of the coating liquid and the coating liquid can be used as in that in Example 1.

Example A3

Addition of silica

A titanium oxide sol (TA-15) was diluted with ethanol to prepare a coating liquid having a titanium oxide particle concentration of 0.5% by weight.

Separately, a titanium oxide sol (TA-15) was mixed with a silica sol ("Glasca A," average particle diameter: 10 nm, manufactured by Japan Synthetic Rubber Co., Ltd.), and the mixture was diluted with ethanol to prepare a coating liquid having a titanium oxide particle concentration of 0.5% by weight and a silica particle concentration of 0.5% by weight.

Each coating liquid was coated on a 10 cm-square soda-lime glass substrate, and the coated substrates were held at 50° C. for one hr and allowed to stand for 15 min to cool the coated substrates, thereby preparing samples A4 and A5.

For the samples A4 and A5, the coating was inspected. As a result, for the sample A4, the coating highly reflected visible light and glared, whereas for the sample A5, the coating did not substantially reflect visible light and had good permeability to visible light.

Further, the samples A4 and A5 were irradiated with light from a light source (BLB fluorescent lamp) at an ultraviolet irradiation intensity of 0.25 mW/cm$^2$ for 2 hr. Thereafter, antifogging property of the coating was evaluated. As a result, both the samples had a good antifogging property (⊚) in the evaluation of the antifogging property according to Example A1.

The above results show that addition of silica having a lower refractive index than titania enables the resultant coating to have an excellent antifogging property while maintaining the permeability of the surface to visible light.

Example A4

Addition of surfactant

A titanium oxide sol (TA-15) was mixed with a silica sol ("Glasca A"), and the mixture was diluted with ethanol to prepare a coating liquid having a titanium oxide particle concentration of 0.5% by weight and a silica particle concentration of 0.5% by weight.

A titanium oxide sol (TA-15) was mixed with a silica sol ("Glasca A") and polyethylene glycol (molecular weight 3000) as a surfactant, and the mixture was diluted with ethanol to prepare a coating liquid having a titanium oxide particle concentration of 0.5% by weight, a silica particle concentration of 0.5% by weight, and a polyethylene glycol concentration of 0.2% by weight.

A titanium oxide sol (TA-15) was mixed with a silica sol ("Glasca A") and a modified silicone (KF-351, polyether type, manufactured by The Shin-Etsu Chemical Co., Ltd.), and the mixture was diluted with ethanol to prepare a coating liquid having a titanium oxide particle concentration of 0.5% by weight, a silica particle concentration of 0.5% by weight, and a modified silicone concentration of 0.2% by weight.

On the other hand, a titanium oxide sol (TA-15) was mixed with a silica sol ("Glasca A") and a modified silicone (KF-945, polyether type, manufactured by The Shin-Etsu Chemical Co., Ltd.), and the mixture was diluted with ethanol to prepare a coating liquid having a titanium oxide particle concentration of 0.5% by weight, a silica particle concentration of 0.5% by weight, and a modified silicone concentration of 0.2% by weight.

Each coating liquid was coated on a 10 cm-square soda-lime glass substrate, and the coated substrates were held at 50° C. for one hr and allowed to stand for 15 min to cool the coated substrates, thereby preparing samples A6 and A9.

Figure 6:
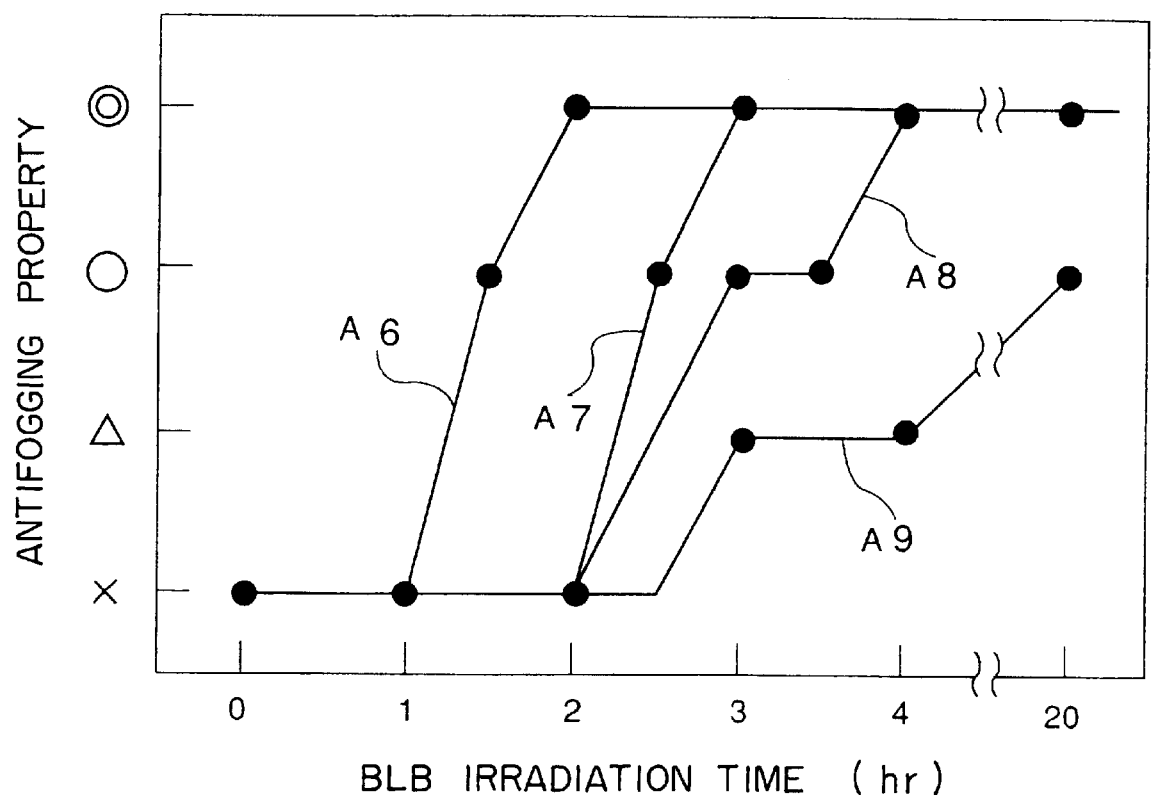
FIG. 6 is a diagram showing a change in antifogging property of a hydrophilic surface prepared in Example A4 as a function of ultraviolet irradiation time.

The samples A6 to A9 were irradiated with light from a light source (BLB fluorescent lamp) at an ultraviolet irradiation intensity of 0.25 mW/cm$^2$ to determine a change in antifogging property of the coating as a function of light irradiation time. The results are as shown in FIG. 6.

Specifically, for the sample A6, a good antifogging property (⊚) was developed upon irradiation for 2 hr. On the other hand, the irradiation time taken for developing a good antifogging property (⊚) was 3 hr for the sample A7, 4 hr for the sample A8, and not less than 20 hr for the sample A9, indicating that addition of a surfactant having stronger influence of the hydrophobic site requires a longer ultraviolet irradiation time for developing an antifogging property.

Example B1

Amount of surfactant

A titanium oxide sol (TA-15), a silica sol ("Glasca A"), a nonionic surfactant comprising a polyoxyethylene p-alkylphenyl ether (Penerole, NP-95, manufactured by Matsumoto Yushi), and ethanol are mixed together to prepare coating liquid samples B1 to B4 composed of titanium oxide particles, silica particles, and a surfactant dispersed in a solvent.

TABLE 1

| Samples | Titanium oxide (parts by weight) | Silica particles (parts by weight) | Surfactant (parts by weight) |
| --- | --- | --- | --- |
| B1 | 50 | 25 | 0 |
| B2 | 50 | 25 | 20 |
| B3 | 50 | 25 | 50 |
| B4 | 50 | 25 | 100 |

Figure 7:
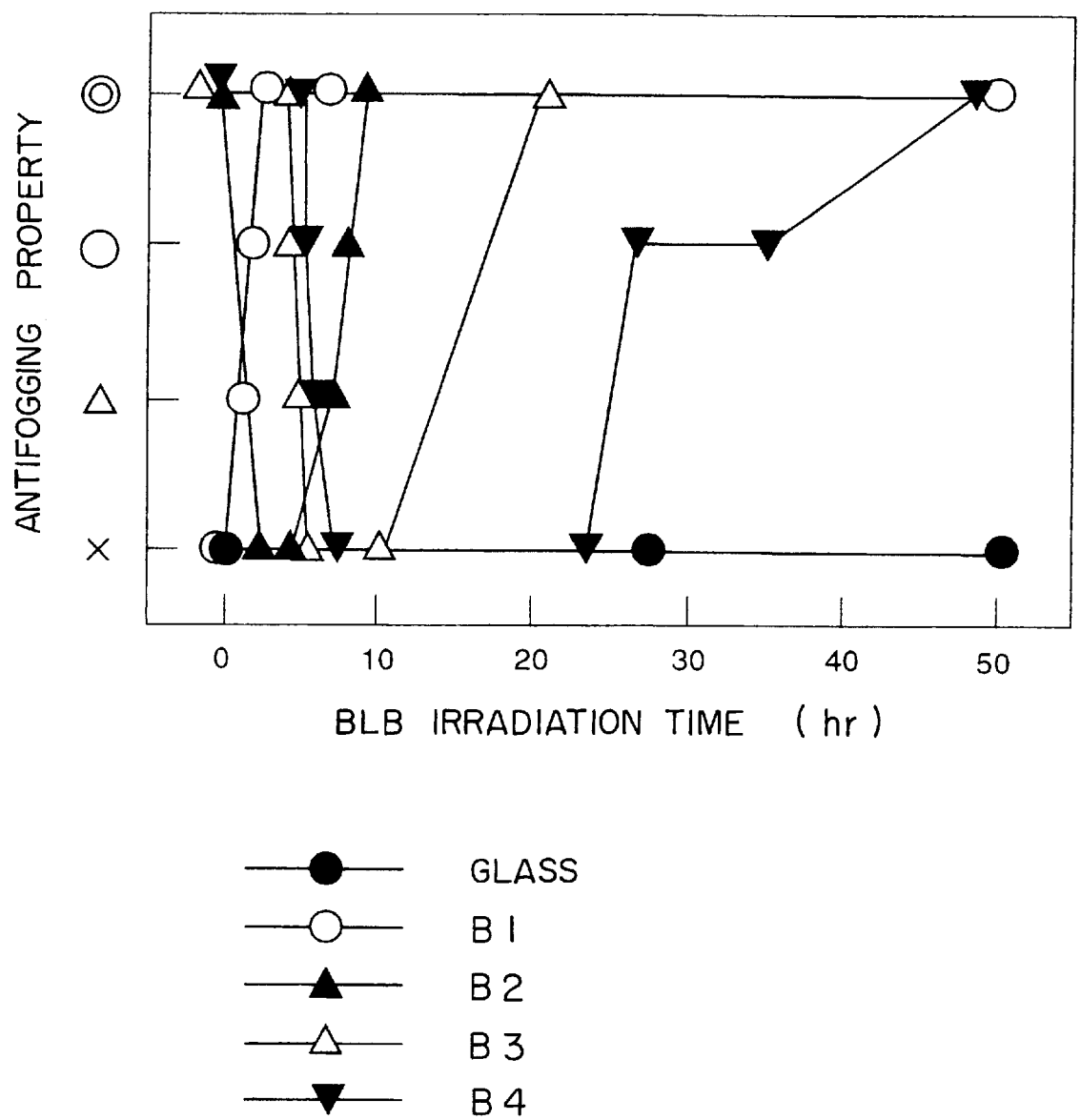
FIG. 7 is a diagram showing a change in antifogging property of a hydrophilic surface prepared in Example B1 as a function of ultraviolet irradiation time.

Each of the coating liquid samples B1 to B4 was coated on a soda-lime glass substrate, and the coating was dried, followed by irradiation with light from an ultraviolet light source (black light blue (BLB)) fluorescent lamp, manufactured by Sankyo Denki) at an ultraviolet irradiation intensity of 0.25 mW/cm$^2$ to determine a change in antifogging property of the coating as a function of light irradiation time. The results are as shown in FIG. 7. Further, the antifogging property was evaluated according to the same criteria as used in Example A1.

As shown in FIG. 7, in spite of ultraviolet irradiation for a very long period of time, the substrate glass per se exhibited only an antifogging property evaluated as ×, whereas, 50 hr after the initiation of the ultraviolet irradiation, all the samples prepared by coating the coating liquid samples B1 to B4 on the surface of the substrate glass exhibited a good antifogging property (⊚).

The sample prepared by coating the coating liquid sample B1 did not exhibited any antifogging property at all before the ultraviolet irradiation, whereas the samples prepared by coating the coating liquid samples B2 to B4 exhibited an antifogging property both before and after the ultraviolet irradiation.

The reason why the sample prepared by coating the coating liquid sample B1 did not exhibit the initial antifogging property is believed to reside in that ethanol remained in the coating. Development of the antifogging property with increasing the irradiation time is considered to be attributable to the decomposition of ethanol by photoexcitation of the photocatalyst.

By contrast, for the samples prepared by the coating liquid samples B2 to B4 with a surfactant incorporated therein, an initial antifogging property can be obtained by virtue of the presence of the surfactant in combination with ethanol. The antifogging property is lost after a while and again restored. The reason for this is as follows. The photoexcitation of the photocatalyst results in decomposition of not only ethanol but also the surfactant to give an intermediate product, in the course of decomposition, which causes the hydrophilicity to be lost, resulting in temporary loss of the antifogging property. Upon complete decomposition of the surfactant, however, the hydrophilicity is again restored, resulting in restored antifogging property.

This demonstrates that addition of a surfactant in addition to photocatalytic titanium oxide particles, silica, and ethanol offers not only a permanent antifogging property but also an initial antifogging property.

The larger the amount of the surfactant, the longer the temporary loss time of the antifogging property. Specifically, for the sample prepared by coating the coating liquid sample B2 with the surfactant being added thereto in an amount as small as 0.4 part by weight based on one part by weight of the photocatalytic titanium oxide particle, the loss time was about 2 hr, and, for the sample prepared by coating the coating liquid sample B3 with the surfactant being added thereto in an amount of 1 part by weight, the loss time was about 5 hr, whereas for the sample prepared by coating the coating liquid sample B4 with the surfactant being added thereto in an amount of 2 parts, the loss time was about 24 hr. Further, for the sample prepared by coating the coating liquid sample with the surfactant being added thereto in an amount of 10 parts by weight based on one part by weight of the photocatalytic titanium oxide particles, the temporary loss time of the antifogging property was 200 hr or more.

The temporary loss time of the antifogging property, for example, when the coating liquid is supplied as an aerosol, is preferably 1 day or less. The amount of the surfactant added is preferably less than 10 parts by weight, more preferably not more than 2 parts by weight.

Further, for the substrate glass which has been irradiated with light from BLB for 50 hr and the samples prepared by coating the coating liquid samples B1 to B4 onto the surface of glass, the contact angle of the surface of the sample with water was measured. The contact angle with water was measured, with a contact angle goniometer (CA-X150, manufactured by Kyowa Interface Science Co., Ltd.), 30 sec after dropping a water droplet through a microsyringe on the surface of the sample.

As a result, the substrate glass had a contact angle of 30°, whereas all the samples prepared by coating the coating liquid samples B1 to B4 onto the surface of the substrate glass had a good contact angle with water, that is, a contact angle of about 0°.

Furthermore, the samples, prepared by coating the coating liquid samples B1 to B4 onto the surface of the substrate glass, which had been evaluated for the contact angle thereof with water, was evaluated for the oil stain releasing capability. Specifically, oleic acid was coated on the surface of each sample, and each sample was then immersed in water filled into a water tank while keeping the surface of the sample horizontal.

As a result, oleic acid became spherical, and light rubbing caused the oil droplet to be released from the surface of the sample.

Example B2

Gloss by adding cationic or nonionic surfactant

A titanium oxide sol (ST-K01) and a titanium oxide sol (ST-K03) (solid content 10% by weight; the solute being composed of 5 parts by weight of titanium oxide (anatase form) and 5 parts by weight of an alkyl silicate) were mixed together in a ratio of 1:1, and the mixture was diluted 20 times with propanol to prepare a photocatalytic coating sample B5. Sorbitan monocaprylate (a nonionic surfactant) was added in an amount of 0.05% by weight (that is, 0.325% by weight based on titanium oxide) to this sample B5 to prepare a sample B6. Sorbitan monocaprylate was added in an amount of 0.1% by weight (that is, 0.65% by weight based on titanium oxide) to the sample B5 to prepare a sample B7. A quaternary ammonium salt (a cationic surfactant) was added in an amount of 0.05% by weight to the sample B5 to prepare a sample B8. Further, a quaternary ammonium salt was added in an amount of 0.1% by weight to the sample B5 to prepare sample B9.

Samples B5 to B9 were coated on a dark gray coated steel sheet, wiped with ethanol, by flow coating, and the treated steel sheet was allowed to stand at room temperature for 18 hr (about 20° C.). For this sample, the gloss was measured according to the procedure set forth in the Japanese Industrial Standards (JIS) Z8741. As a result, the gloss was 94 for the coated steel sheet. On the other hand, it was 96 for the sample B5, and the gloss for the samples B6 to B9 with a surfactant added thereto were respectively 102, 110, 106, and 112, indicating that addition of a surfactant resulted in development of gloss.

Then, samples B5 to B9 were coated on a slide glass, wiped with ethanol, by flow coating, and the coated slide glasses were allowed to stand at room temperature (about 20° C.) for 18 hr. Therefore, these samples were irradiated with light from an ultraviolet light source (black light blue (BLB)) fluorescent lamp, manufactured by Sankyo Denki) at an ultraviolet irradiation intensity of 0.5 mW/cm$^2$ to determine a change in antifogging property of the coating as a function of light irradiation time. As a result, it was found that the samples B5 to B7 had a good antifogging property (⊚) from the beginning, the sample B8 developed an antifogging property evaluated as ⊚ 1.5 hr after the initiation of the ultraviolet irradiation, and the sample B9 developed an antifogging property evaluated as ⊚ 5 hr after the initiation of the ultraviolet irradiation.

Example C1

Addition of anionic surfactant

Water (2450 parts by weight) and 0.025 part by weight of an anionic surfactant (Rapisol A-80, manufactured by Nippon Oils & Fats Co., Ltd.) were added to a titanium oxide sol (ST-K01) to prepare a sample C1.

Water (2450 parts by weight) and 0.25 part by weight of an anionic surfactant (Rapisol A-80, manufactured by Nippon Oils & Fats Co., Ltd.) were added to a titanium oxide sol (ST-K01) to prepare a sample C2.

The samples C1 and C2 were allowed to stand for 3 days, during which time no agglomeration occurred.

Thereafter, the samples C1 and C2 were coated on a 10 cm-square soda-lime glass plate by flow coating, and the coating was dried at room temperature for one hr to prepare samples C3 and C4.

For the samples C3 and C4, neither haze development nor interference fringe was observed, and a transparent, uniform coating could be formed.

Thereafter, the surface of the samples C3 and C4 was irradiated with light from an ultraviolet light source (black light blue (BLB)) fluorescent lamp, manufactured by Sankyo Denki) at an ultraviolet irradiation intensity of 0.25 mW/cm$^2$ for one day, followed by investigation on the contact angle of these samples with water, the antifogging property, and the removal of an oil stain with water. The contact angle with water was measured, with a contact angle goniometer (CA-X150, manufactured by Kyowa Interface Science Co.,Ltd.), 30 sec after dropping a water droplet through a microsyringe on the surface of the sample.

As a result, both the samples C3 and C4 were highly hydrophilified to a contact angle thereof with water of about 0° C. For comparison, the contact angle of the soda-glass plate with water was measured and found to be 30.

The antifogging property was evaluated according to the same criteria as used in Example A1.

As a result, both the samples C3 and C4 had a good antifogging property (⊚).

Further, the samples C3 and C4 were evaluated for the oil stain releasing capability. Specifically, oleic acid was coated on the surface of each sample, and each sample was then immersed in water filled into a water tank while keeping the surface of the sample horizontal.

As a result, for both the samples, oleic acid became spherical, and light rubbing caused the oil droplet to be released from the surface of the samples.

Example D1

Addition of alcohol for a small subject

A titanium oxide sol (ST-K01) was diluted 25 times with 2-propanol to a coating liquid sample D1.

The coating liquid was spray-coated on a 10 cm-square soda-lime glass substrate, and the coating was dried at room temperature (20° C.) for 20 min to cure the coating, thereby preparing a sample D2.

On the other hand, a titanium oxide sol (ST-K01) was diluted 25 times with ethanol to prepare a coating liquid sample D3.

The coating liquid was coated on a 10 cm-square soda-lime glass substrate by flow coating, and the coating was dried at room temperature (20° C.) for 20 min to cure the coating, thereby preparing a sample D4.

Subsequently, for the samples D2 and D4, investigations were made on the contact angle with water and the appearance.

The surface of the samples D2 and D4 was irradiated with light from a light source (black light blue (BLB)) fluorescent lamp, manufactured by Sankyo Denki) at an ultraviolet irradiation intensity of 0.5 mW/cm$^2$ for 24 hr. After the irradiation, the contact angle of these samples with water was measured, with a contact angle goniometer (CA-X150, manufactured by Kyowa Interface Science Co., Ltd.), 30 sec after dropping a water droplet through a microsyringe on the surface of the sample.

As a result, both the samples D2 and D4 were highly hydrophilified to a contact angle thereof with water of 0° C. In addition, for the samples D2 and D4, the coatings were transparent in appearance and free from lack of uniformity.

Example D2

Addition of alcohol for large subject

The coating liquid sample D1 of Example D1 was coated on a 50 cm-square soda-lime glass substrate by flow coating, and the coating was dried at room temperature (20° C.) for 20 min to cure the coating, thereby preparing a sample D5.

On the other hand, the coating liquid sample D3 of Example D1 was coated on a 50 cm-square soda-lime glass substrate by flow coating, and the coating was dried at room temperature (20° C.) for 20 min to cure the coating, thereby preparing a sample D6.

For the samples D5 and D6, investigations were made on the contact angle with water and the appearance.

The surface of the samples D5 and D6 was irradiated with light from a light source (black light blue (BLB)) fluorescent lamp, manufactured by Sankyo Denki) at an ultraviolet irradiation intensity of 0.5 mW/cm$^2$ for 24 hr. After the irradiation, the contact angle of these samples with water was measured, with a contact angle goniometer (CA-X150, manufactured by Kyowa Interface Science Co., Ltd.), 30 sec after dropping a water droplet through a microsyringe on the surface of the sample.

As a result, both the samples D5 and D6 were highly hydrophilified to a contact angle thereof with water of 0° C.

In this case, however, for the sample D6, clouding was created in a position distant from the starting point of the flow coating, whereas for the sample D5, the coating was transparent in appearance and free from lack of uniformity.

Thus, this suggests that the use of propanol is preferably for the applicaiton to a large size of a subject.

Example D3

Addition of alcohol for large subject

A titanium oxide sol (ST-K01) and a titanium oxide sol (ST-K03) were mixed together in a ratio of 1:1, and the mixture was diluted 25 times with 2-propanol to prepare a coating liquid sample D7.

The coating liquid sample D7 was coated on a 50 cm-square soda-lime glass substrate by flow coating, and the coating was dried at room temperature (20° C.) for 20 min to cure the coating, thereby preparing a sample D8.

Subsequently, for the sample D8, investigations were made on the contact angle with water and the appearance in the same manner as in Example D1.

As a result, it was found that the sample D8 was superhydrophilified to a contact angle with water of 0° and the coating was transparent in appearance and free from lack of uniformity.

Example D4

Addition of alcohol for large subject

A titanium oxide sol (ST-K01) and a titanium oxide sol (ST-K03) were mixed together in a ratio of 1:1, and the mixture was diluted 25 times with an 8 : 2 mixture of 2-propanol and propylene glycol monopropyl ether to prepare a coating liquid sample D9.

The coating liquid sample D9 was coated on a 50 cm-square soda-lime glass substrate by flow coating, and the coating was dried at room temperature (20° C.) for 20 min to cure the coating, thereby preparing a sample D10.

Subsequently, for the sample D10, investigations were made on the contact angle with water and the appearance in the same manner as in Example D1.

As a result, it was found that the sample D10 was superhydrophilified to a contact angle with water of 0° and the coating was transparent in appearance and free from lack of uniformity.

Example D5

Addition of alcohol for large subject

A titanium oxide sol (ST-K01) and a titanium oxide sol (ST-K03) were mixed together in a ratio of 1:1, and the mixture was diluted 25 times with a 9:1 mixture of 2-propanol and diacetone alcohol (4-hydroxy-4-methyl-pentanone) to prepare a coating liquid sample D11 (pH 4).

The coating liquid sample D11 was coated on a 50 cm-square soda-lime glass substrate by flow coating, and the coating was dried at room temperature (20° C.) for 20 min to cure the coating, thereby preparing a sample D12.

Subsequently, for the sample D12, investigations were made on the contact angle with water and the appearance in the same manner as in Example D1.

As a result, it was found that the sample D12 was superhydrophilified to a contact angle with water of 0° and the coating was transparent in appearance and free from lack of uniformity.

Example D6

Application to body of automobile: Addition of levelling agent

A titanium oxide sol (ST-K01) and a titanium oxide sol (ST-K03) were mixed together in a ratio of 1:1, and the mixture was diluted 25 times with a 9:1 mixture of ethanol and diacetone alcohol to prepare a coating liquid sample D13.

The coating liquid sample D13 was coated on a hood (a bonnet) of an automobile, by flow coating, and the coating was dried at room temperature (20° C.) for 20 min to cure the coating, thereby preparing a sample D14.

For the sample D14, investigations were made on the contact angle with water and the appearance in the same manner as in Example D1.

As a result, it was found that the sample D14 was superhydrophilified to a contact angle with water of 0°. The surface of the coating was smooth, and the coating was transparent in appearance and free from lack of uniformity.

Example D7

Application to body of automobile: Addition of levelling agent

A titanium oxide sol (ST-K01) and a titanium oxide sol (ST-K03) were mixed together in a ratio of 1:1, and the mixture was diluted 25 times with a 8:1:1 mixture of ethanol, 2-propanol, and diacetone alcohol to prepare a coating liquid sample D15.

The coating liquid sample D15 was coated on a hood (bonnet) of an automobile by flow coating, and the coating was dried at room temperature (20° C.) for 20 min to cure the coating, thereby preparing a sample D16.

For the sample D16, investigations were made on the contact angle with water and the appearance in the same manner as in Example D1.

As a result, it was found that the sample D16 was superhydrophilified to a contact angle with water of 0° and the coating was transparent in appearance and free from lack of uniformity.

Example D8

Addition of ethanol with levelling agent

A titanium oxide sol (ST-K01) and a titanium oxide sol (ST-K03) were mixed together in a ratio of 1:1, and the mixture was diluted 25 times with an 8:2 mixture of ethanol and propylene glycol monopropyl ether to prepare a coating liquid sample D17.

The coating liquid sample D17 was coated on a 50 cm-square soda-lime glass substrate by flow coating, and the coating was dried at room temperature (20° C.) for 20 min to cure the coating, thereby preparing a sample D18.

For the sample D18, investigations were made on the contact angle with water and the appearance in the same manner as in Example D1.

As a result, it was found that the sample D18 was superhydrophilified to a contact angle with water of 0° and the coating was transparent in appearance and free from lack of uniformity.

Example D9

Addition of ethanol with levelling agent

A titanium oxide sol (ST-K01) and a titanium oxide sol (ST-K03) were mixed together in a ratio of 1:1, and the mixture was diluted 25 times with a 9:1 mixture of ethanol and butyl cellosolve (2-butoxy ethanol) to prepare a coating liquid sample D19.

The coating liquid sample D19 was coated on a hood (bonnet) of an automobile by flow coating, and the coating was dried at room temperature (20° C.) for 20 min to cure the coating, thereby preparing a sample D20.

For the sample D20, investigations were made on the contact angle with water and the appearance in the same manner as in Example D1.

As a result, it was found that the sample D20 was superhydrophilified to a contact angle with water of 0° and the coating was transparent in appearance and free from lack of uniformity.

Example D10

Aerosol composition

The coating liquid sample D11 prepared in Example D5 and a nitrogen gas were filled in a volume ratio of 6:4 into an aerosol container shown in FIG. 1. From this aerosol container, the coating liquid sample D11 was sprayed onto a slide glass substrate, and the coating was allowed to stand at room temperature for 30 min to prepare a sample D13.

For the sample D13, investigations were made on the contact angle with water and the appearance in the same manner as in Example D1.

As a result, it was found that the sample D13 was superhydrophilified to a contact angle with water of 0° and the coating was transparent in appearance and free from lack of uniformity.

Example E1

Solid content and transparent of coating

A soda-lime glass sheet (dimension: 40×100×2 mm) was immersed in a solution prepared by diluting a titanium oxide sol (ST-K01) with ethanol and dip-coated by pulling up the soda-lime glass sheet at a pulling rate of 24 cm/min. The dilution of the titanium oxide sol with ethanol was performed to the following solid contents. Thereafter, the coatings were heated at 50° C. or 150° C. to prepare samples E1 to E8. For these samples, the haze was measured with a haze meter (Hazegardplus, manufactured by Gardener).

The results are summarized in the following table.

| Samples | Solid content (wt %) | Heat treatment temp. (° C.) | Haze (%) |
|---------|----------------------|------------------------------|----------|
| E1 | 10  | 50  | 12   |
| E2 | 5   | 50  | 0.25 |
| E3 | 1   | 50  | 0.12 |
| E4 | 0.1 | 50  | 0.23 |
| E5 | 10  | 150 | 10   |
| E6 | 5   | 150 | 0.22 |
| E7 | 1   | 150 | 0.12 |
| E8 | 0.1 | 150 | 0.27 |

Example E2

Solid content and hardness of coating

Samples E9 to E16 were prepared in the same manner as in Example El, except that ST-K03 was used as the titanium oxide sol. These samples were subjected to a pencil hardness test according to the procedure set forth in the Japanese Industrial Standards (JIS) H8602. The results are summarized in the following table.

| Samples | Solid content (wt %) | Heat treatment temp. (° C.) | Pencil hardness |
|---------|----------------------|------------------------------|-----------------|
| E9  | 10  | 50  | 5B |
| E10 | 5   | 50  | 6B |
| E11 | 1   | 50  | 9H |
| E12 | 0.1 | 50  | 9H |
| E13 | 10  | 150 | 6B |
| E14 | 5   | 150 | 6B |
| E15 | 1   | 150 | 8H |
| E16 | 0.1 | 150 | 9H |

What is claimed is:

1. A composition for hydrophilifying the surface of a member, comprising at least
   (a) photocatalytic particles of a metallic oxide,
   (b) a silicon-based component selected from the group consisting of silica fine particles, a precursor capable of forming a silica film and combinations thereof, and
   (c) a solvent,
   wherein the total content of the photocatalytic particles and the silicon in the silicon-based component in the composition is 0.01 to 1% by weight.

2. The composition according to claim 1, which, when applied to the surface of a member, has, upon application of light on the surface of the member, a hydrophilicity of not more than 10° in terms of the contact angle of the surface with water.

3. The composition according to claim 2, wherein the contact angle of the surface with water is 5°.

4. The composition according to any one of claims 1 to 3, wherein the average crystallite diameter of the photocatalytic particles is 100 nm or less.

5. The composition according to any one of claims 1 to 3, wherein the photocatalytic particles are constituted by the anatase form of titanium oxide.

6. The composition according to any one of claims 1 to 3, which further comprises a material having a refractive index of not more than 2.

7. The composition according to any one of claims 1 to 3, wherein the solvent is an alcohol.

8. The composition according to any one of claims 1 to 3, which further comprises a surfactant.

9. The composition according to claim 8, wherein the content of the surfactant is less than 10 parts by weight based on one part by weight of the photocatalytic particle.

10. The composition according to claim 9, wherein the content of the surfactant is 0.4 to 2 parts by weight based on one part by weight of the photocatalytic particle.

11. The composition according to any one of claims 1 to 3, which further comprises an acid.

12. The composition according to any one of claims 1 to 3, which further comprises an antibacterial metal or a compound thereof.

13. The composition according to any one of claims 1 to 3, which further comprises at least one metal selected from the group consisting of platinum, palladium, rhodium, ruthenium, osmium, and iridium.

14. The composition according to any one of claims 1 to 3, wherein the photocatalytic oxide is selected from the group consisting of anatase form of titanium oxide, rutile form of titanium oxide, zinc oxide, tin oxide, ferric oxide, dibismuth trioxide, tungsten trioxide, and strontium titanate.

15. The composition according to claim 14, which, when applied to the surface of a member, imparts an antifogging property to the surface of the member.

16. The composition according to claim 14, which, when applied to the surface of a member to form a film, permits condensed water of moisture and/or water droplets adhered onto the surface to be spread on the film, thereby enabling the film to prevent the surface from being fogged or clouded by the condensed water of moisture and/or the water droplets.

17. The composition according to claim 14, which, when applied to the surface of a member to form a film, enables a contaminant adhered onto the surface to be easily washed away by water.

18. An aerosol composition comprising the composition according to any one of claims 1 to 3, and a propellant.

19. A method for hydrophilifying the surface of a member, comprising the steps of:

applying the composition according to any one of claims 1 to 3 onto the surface of a member; and drying or curing the composition.

20. A member, having a hydrophilified surface, produced by the method according to claim 19.

21. The method according to claim 19, wherein the member is transparent and the member thus obtained is also transparent.

22. The composition according to any one of claims 1 to 3, wherein the precursor of a silica film is selected from the group consisting of tetramethoxysilane, tetraethoxysilane, tetrapropoxysilane, tetrabutoxysilane, diethoxydimethoxysilane, tetrachlorosilane, tetrabromosilane, silanol, and dimethoxydiethoxysilane, and partial hydrolyzates and dehydropolycondensation products of the tetrafunctional hydrolyzable derivatives thereof.

* * * * *